United States Patent
MacArthur

(10) Patent No.: US 8,527,335 B1
(45) Date of Patent: Sep. 3, 2013

(54) SYSTEM AND METHOD FOR REDUCING POLLUTION

(76) Inventor: Robert S. MacArthur, Cambridge, MA (US)

( * ) Notice: Subject to any disclaimer, the term of this patent is extended or adjusted under 35 U.S.C. 154(b) by 196 days.

(21) Appl. No.: 12/831,700

(22) Filed: Jul. 7, 2010

Related U.S. Application Data

(60) Provisional application No. 61/270,356, filed on Jul. 7, 2009.

(51) Int. Cl.
  *G06Q 30/00* (2012.01)
(52) U.S. Cl.
  USPC .................. 705/14.31; 705/14.18; 705/14.17
(58) Field of Classification Search
  USPC .......................................................... 705/14
  See application file for complete search history.

(56) References Cited

U.S. PATENT DOCUMENTS

| | | | |
|---|---|---|---|
| 7,343,341 B2 | 3/2008 | Sandor et al. | |
| 2005/0154669 A1 | 7/2005 | Streetman | |
| 2008/0228630 A1* | 9/2008 | Gotthelf et al. | 705/37 |
| 2008/0270272 A1* | 10/2008 | Branscomb | 705/30 |
| 2009/0043653 A1* | 2/2009 | Sandor et al. | 705/14 |
| 2009/0157510 A1* | 6/2009 | Pridmore et al. | 705/14 |
| 2009/0157534 A1* | 6/2009 | Arsiwala | 705/30 |
| 2010/0145753 A1 | 6/2010 | Pauly et al. | |
| 2010/0250356 A1* | 9/2010 | Gillenson et al. | 705/14.18 |
| 2011/0045899 A1* | 2/2011 | Amour | 463/25 |
| 2011/0137812 A1* | 6/2011 | Sherga | 705/317 |

OTHER PUBLICATIONS

Galbraith, Kate, "Offsets in the Air in San Francisco", Jan. 2, 2009, New York Times, NYTimes.com, p. 1.*
Kho, Jennifer, "Carbon Offset Market Heats up by 3Degrees", Oct. 10, 2007, www.greentechmedia.com, pp. 1-3.*
Web Pages from Cool Earth: http://www.coolearth.org/407/category/the-solution-185.html, The Solution—Protecting rainforests with Cool Earth Action—Keeping carbon where it be. Retrieved on May 31, 2012 (2 pages).
Web Pages from Environmental Leader: Environmental & Energy Management News: http://www.environmentalleader.com/2007/10/31/enterprise-offers-voluntary-carbon-offset- program-to-customers/, "Enterprise Offers Voluntary Carbon Offset Program to Customers" article dated Oct. 31, 2007. Retrieved on May 31, 2012 (2 pages).

\* cited by examiner

*Primary Examiner* — Alvin L Brown
(74) *Attorney, Agent, or Firm* — Goodwin Procter LLP

(57) ABSTRACT

In various embodiments, pollution is reduced by associating a pollution credit with a consumer product or service. The pollution credit is transformed into points and purchasing the product or service earns the points. The points may be accumulated and redeemed for value, thus retiring the pollution credit.

32 Claims, 6 Drawing Sheets

SYSTEM AND METHOD FOR REDUCING POLLUTION

CROSS-REFERENCE TO RELATED APPLICATIONS

This application claims priority to and the benefit of U.S. Provisional Patent Application Ser. No. 61/270,356, filed on Jul. 7, 2009, which is hereby incorporated herein by reference in its entirety.

TECHNICAL FIELD

Embodiments of the invention generally relate to pollution reduction and, more particularly, to the distribution and sale of pollution credits.

BACKGROUND

Pollution, emissions, global warming, and other environmental issues continue to gain media exposure and public awareness. Some consumers purchase products or services based on how environmentally friendly or "green" they perceive the manufacturer and/or seller of the product or service to be, and some of those consumers are willing to pay a premium price for doing so. Products may be marketed as being "green" in an attempt to woo consumers.

The environmental benefit of buying an existing "green" product or service, however, is not precisely quantified, and a consumer has no way to know how much a given purchase may benefit the environment, if indeed it does so at all. Consumers may be wary of overblown marketing claims (or "greenwashing") but may not be able to invest the time, energy, or money in researching a "green" marketing claim to determine its authenticity. Many such skeptical consumers may be reluctant to choose a "green" product, even if it is the same price as another, similar product.

New markets in the sale of pollution/emission credits are emerging in an attempt to provide economic incentives to reduce pollution. A cap-and-trade market, for example, enables a low-polluting entity to sell unused pollution credits to a high-polluting entity, thereby providing an incentive to reduce pollution and a penalty for emitting a high amount of pollution. Such markets, however, tend to trade in bulk quantities of pollution credits and are inaccessible to an average consumer.

A need therefore exists for a way to incentivize consumers to purchase products and services by offering a tangible, measureable "green" benefit that taps into the emerging emissions markets; and for manufacturers, service providers, and marketers to promote "green" as part of their sales activities.

SUMMARY

In general, various aspects of the systems, methods, and apparatus described herein relate to reducing pollution by associating a pollution credit with a consumer product or service. Pollution credits are obtained from a source (e.g., a cap-and-trade market) and are transformed into points. A product or service is offered advertising that a certain number of the points may be redeemed (e.g., an amount of pollution reduced) upon purchase of the product or service. A purchaser may redeem the points for value.

In general, in a first aspect, a method for reducing pollution begins with receiving a credit representing an amount of pollution from a pollution-credit source. A credit point value based at least in part on the credit is determined using a computer processor and stored in a database embodied on a computer-readable medium. Points (associated with at least one of a product and a service) representing at least a portion of the credit point value are sent to a point distribution facilitator. A request to redeem the points is received from a purchaser of the product or service. A redemptive value is sent to the purchaser in exchange for the points.

In various embodiments, data regarding the purchaser may be stored in the database and sent to a third party in exchange for value. Value from the facilitator may be received in response to sending the points. A message may be sent to the facilitator indicating receipt of the request to redeem the points, and in response to the message a value for the points may be received from the facilitator. The method may further include validating that the credit represents the amount of pollution and/or receiving credits from a plurality of pollution-credit sources. Point values based on the credits may be determined, and a pool of the determined point values may be created. A message may be received from the facilitator indicating a transfer of the point value to a second distributor and stored in the database.

The point value may be embodied in various embodiments on a printed coupon, an electronic coupon, a tag, a warranty, a product package, a service contract, and/or a computer icon. The redemptive value may include a monetary value, a product discount, and/or a charitable contribution. The facilitator may be a manufacturer, a direct marketer, a service provider, a distributor, and/or a merchant. The pollution-credit source may be a government entity, a pollution emitter, a commodity exchange, and/or a pollution-credit market. The amount of pollution may correspond at least in part to a carbon credit, carbon dioxide effluent, and/or another greenhouse gas effluent (e.g., methane, nitrous oxide, chlorofluorocarbons, ozone, etc.).

In general, in another aspect, a computer-based system for reducing pollution includes computer memory for storing a credit (received from a pollution-credit source) representing an amount of pollution. A point-determination software module determines a credit point value based at least in part on the credit, and a computer database stores the credit point value. A point-transmission software module tracks sending of points (associated with a product or service) representing at least a portion of the credit point value to a point-distribution facilitator. A point-receiving software module tracks receipt of a request to redeem the points from a purchaser of the product or service, and a point-redemption software module tracks sending of a redemptive value to the purchaser in exchange for the points.

In various embodiments, the computer database may also store data regarding the purchaser in the database and/or a message indicating a transfer of the point value to a second distributor, and the computer memory may also store credits from a plurality of pollution-credit sources. A point-validation software module may validate that the credit represents the amount of pollution. The point-determination module may also determine point values based on the credits and create a pool of the determined point values.

The point value may be embodied in various embodiments on a printed coupon, an electronic coupon, a tag, a warranty, a product package, a service contract, and/or a computer icon. The redemptive value may include a monetary value, a product discount, and/or a charitable contribution. The facilitator may be a manufacturer, a direct marketer, a service provider, a distributor, and/or a merchant. The pollution-credit source may be a government entity, a pollution emitter, a commodity exchange, and/or a pollution-credit market. The amount of pollution may correspond at least in part to a carbon credit, carbon dioxide effluent, and/or another greenhouse gas effluent.

In general, in yet another aspect, an article of manufacture stores computer-readable instructions thereon for reducing pollution. The article of manufacture includes instructions to store a credit (received from a pollution-credit source) representing an amount of pollution in computer memory and instructions to determine a credit point value based at least in part on the credit. Further instructions include instructions to store the credit point value in a computer database and instructions to track sending of points (associated with a product or service) representing at least a portion of the credit point value to a point distribution facilitator. The article of manufacture further includes instructions to track receipt of a request to redeem the points from a purchaser of the product or service and instructions to track sending of a redemptive value to the purchaser in exchange for the points.

In various embodiments, the computer database may also store data regarding the purchaser in the database and/or a message indicating a transfer of the point value to a second distributor, and the computer memory may also store credits from a plurality of pollution-credit sources. The article of manufacture may include instructions to validate that the credit represents the amount of pollution. The instructions to determine a credit point value may further include instructions to determine point values based on the credits and create a pool of the determined point values The point value may be embodied in various embodiments on a printed coupon, an electronic coupon, a tag, a warranty, a product package, a service contract, and/or a computer icon. The redemptive value may include a monetary value, a product discount, and/or a charitable contribution. The facilitator may be a manufacturer, a direct marketer, a service provider, a distributor, and/or a merchant. The pollution-credit source may be a government entity, a pollution emitter, a commodity exchange, and/or a pollution-credit market. The amount of pollution may correspond at least in part to a carbon credit, carbon dioxide effluent, and/or another greenhouse gas effluent.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Described herein are various embodiments of methods, systems, and apparatus for removing pollutants/emissions (in particular, carbon) from the cap-and-trade and other similar markets, thereby contributing to, for example, the lowering of society's carbon footprint. The supply of pollution credits is thereby reduced on the open market, and their cost is increased for use as a counter-balance to the continuing pollution of non-compliant emitters. Consumers may benefit by receiving an opportunity and means to participate in socially responsible buying while receiving tangible and intangible rewards associated with lowering global emissions. Merchants, manufacturers, producers, and service providers may benefit by building customer loyalty, increasing sales, and by capturing consumer-profile data for marketing purposes.

Figure 1:
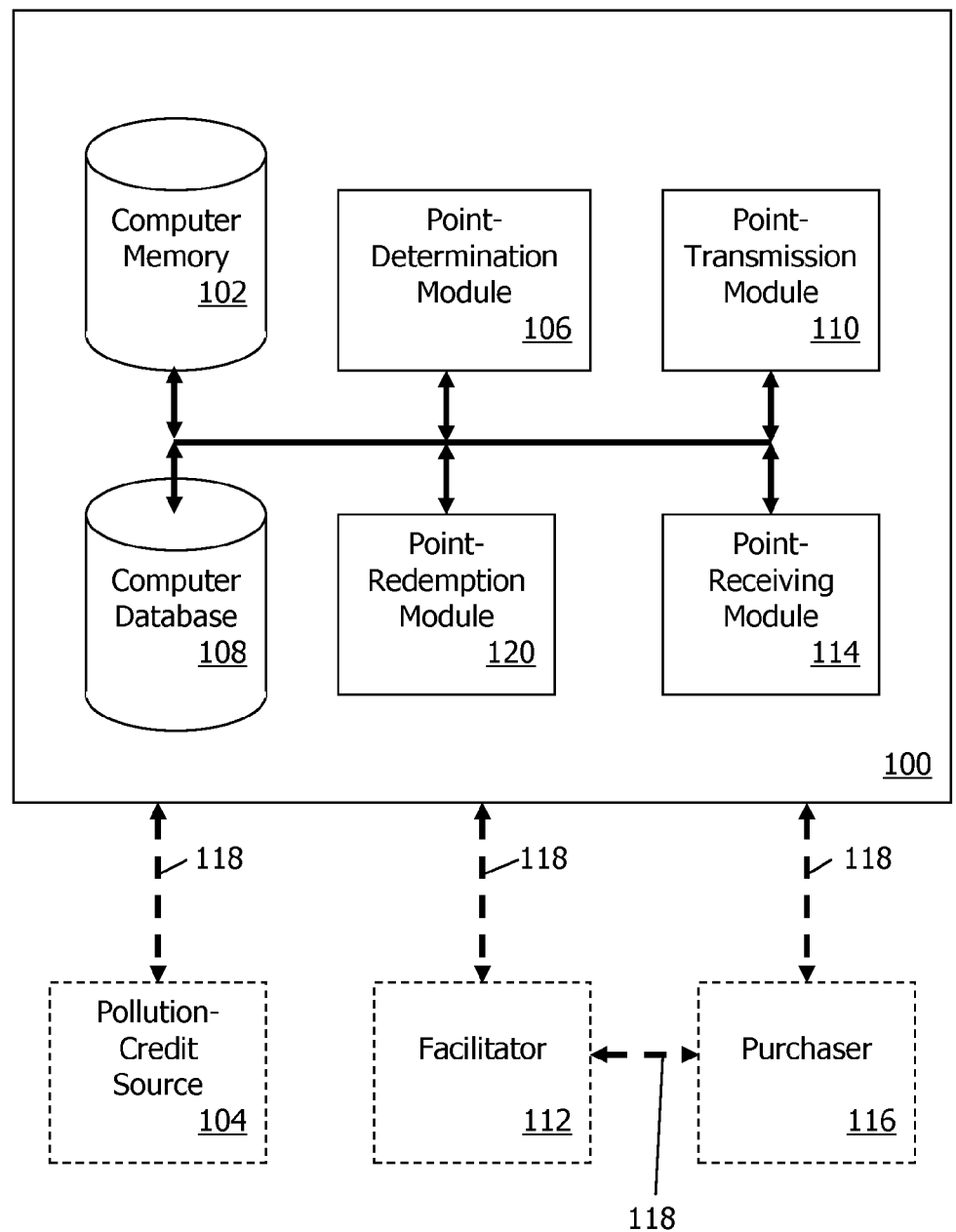
FIG. 1 is a block diagram of a system for reducing pollution in accordance with an embodiment of the invention.

FIG. 1 illustrates a system 100 for reducing pollution. Computer memory 102 stores a credit representing an amount of pollution. The credit is received from a pollution-credit source 104 such as a pollution emitter, commodity exchange, voluntary market in pollution, regulated market in pollution (e.g., cap-and-trade), or any other similar source. The credit is typically purchased. A point-determination software module 106 determines a credit point value based at least in part on the received credit, and a computer database 108 stores the credit point value. A point-transmission software module 110 tracks sending of points to a point-distribution facilitator 112. The points represent at least a portion of the credit-point value and may be associated with a product or service offered by the facilitator 112 or other entity. A point-receiving software module 114 tracks receipt of a request to redeem the points from a purchaser 116 of the product or service. A point-redemption software module 120 tracks sending of a redemptive value to the purchaser 116 in exchange for the points. The point redemptive value may be pre-set and transferred to a purchaser 116 along with a product or service. The system 100, pollution-credit source 104, facilitator 112, and purchaser 116 may be connected by a communications channel or channels 118. In various embodiments, a communications channel 118 may be a digital computer network, such as the Internet, or a non-digital channel such as a telephone network, U.S. mail, package delivery service, or even an in-person meeting.

The system 100 may be any computing device capable of receiving information/data from and delivering information/data to the pollution-credit source 104, facilitator 112, and purchaser 116. The computer memory 102 and/or the computer database 108 may store computer-readable instructions for execution on the system 100. The system 100 may include a visual display device (e.g., a computer monitor), a data entry device (e.g., a keyboard), a processor, and a mouse. In various embodiments, the system 100 is any type of personal computer, terminal, network computer, wireless device, information appliance, workstation, mini computer, mainframe computer, personal-digital assistant, smart phone, handheld device, or other computing device that is capable of both presenting information/data to, and receiving commands from, a user thereof. The channels 118 may be standard telephone lines, LAN or WAN links (e.g., T1, T3, 56 kb, X.25), broadband connections (e.g., ISDN, Frame Relay, ATM), Fiber-Distributed Data Interface ("FDDI"), RS232, IEEE 802.11, IEEE 802.11a, IEEE 802.11b, IEEE 802.11g, or other wireless connections and may use a variety of communication protocols (e.g., HTTP, TCP/IP, IPX, SPX, NetBIOS, NetBEUI, SMB, Ethernet, ARCNET, and direct asynchronous connections).

Figure 2:
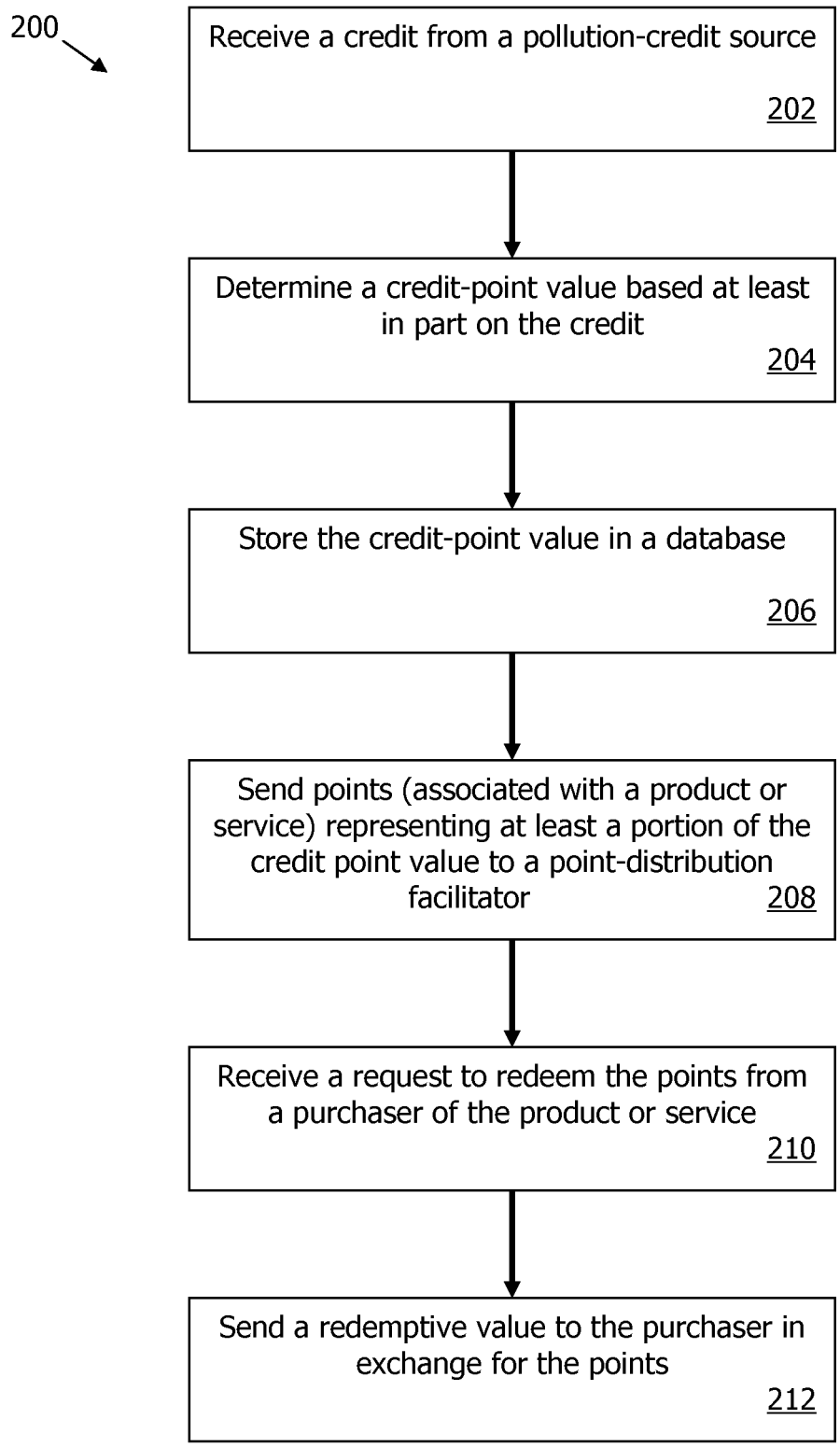
FIG. 2 is a flow chart of a method for reducing pollution in accordance with an embodiment of the invention.

FIG. 2 illustrates a method for reducing pollution. In summary, a credit is received from a pollution-credit source (Step 202), and a credit-point value of the credit is determined (Step 204). The credit-point value is stored in a database (Step 206). Points, representing at least a portion of the credit point value, are sent to a point-distribution facilitator (Step 208). A request to redeem the points is received from a purchaser of the product or service (Step 210), and a redemptive value is sent to the purchaser in exchange for the points (Step 212).

In greater detail, in Step 202 a credit is received from a pollution-credit source, which may be a mandatory market (e.g., the Regional Greenhouse Gas Initiative market), a voluntary market (e.g., the Chicago Climate Exchange), a regulated market (e.g., a cap-and-trade market), a pollution emitter, a private company, a municipality, a state or federal government, and/or any other entity that trades in pollution credits. The term "credit" or "pollution credit," as used herein, refers to any potentially pollution-offsetting commodity, such as a traditional credit or direct purchase of a greenhouse gas (from, e.g., the Chicago Climate Exchange). In one embodiment, the pollution credit is stored in computer memory 102. The pollution credit may represent carbon, carbon dioxide, greenhouse gas, or any other pollutant or emission. The pollution credits may be purchased together in large or small groups, in accordance with any minimum trading size imposed by a market. For example, one or more credits may correspond to a ton of carbon emissions. The pollution credits may be purchased with cash or credit or as commodity futures.

The pollution credits may be validated to assure their legitimacy (e.g., their source and quantity). For example, the source of a pollution credit may be independently contacted to confirm that the credit corresponds to an actual amount of an emitted pollutant and that the pollution credit has not been previously sold. Validation may occur after receipt of the credit (Step 202) and before determining a credit-point value (Step 204). Every pollution credit may be validated, especially in the case of new or unproven credit markets, or a random sampling of credits may be validated. In one embodiment, a third party may be contracted to perform the validation. A special logo or indication may accompany a validated pollution credit (and/or points derived therefrom, as explained further below) to provide assurance that the pollution credit and/or point represents a real pollutant.

Purchased pollution credits may be pooled. The credits may be purchased at different times, in different quantities, and/or from different sources. Adding the different credits to a pool may homogenize them into a more convenient form. For example, the average cost of the pollutant in tons in the pool may be calculated in terms of a cost per pound, and this single cost per pound may be applied to every credit in the pool, regardless of the actual cost of each particular credit. The size of a pool may vary based on the incoming quantity and rate of pollution credits; a maximum pool size may be established, for example, as may a maximum amount of time that a pool may remain open and accepting new pollution credits. A single, large purchase of pollution credits may be divided into a plurality of pools. One or more pools may be open (i.e., accepting new credits) at any given time, and incoming pollution credits may be assigned to different pools having properties similar to the incoming credits.

A credit-point value of a credit or credits may be determined by the point-determination module 106 (Step 204) and stored in the computer database 108 (Step 206). Points may represent a known quantity of pounds of emission credits, but are not pollution credits in themselves. Pollution credits, either alone or pooled, may be fractionalized and converted into marketable points. In one embodiment, a dollar of a purchased good or service corresponds to one point, and one point corresponds to one pound of a pollutant (e.g., carbon). Any ratio, however, of dollars to points or of points to quantities of pollution is contemplated by the current invention.

Points may be treated as a currency within and among the system 100 and/or distribution models 300, 400, 500, 600, as described below. For example, the purchaser 116 may purchase a product from a first facilitator 112 (e.g., an OEM) and redeem the points associated therewith a second facilitator 112 (e.g., a retail merchant), exchange the points for cash, and/or donate the points to a charity.

A base cost of a point may be determined by calculating the cost per pound of a plurality of credits (in, e.g., a credit pool). Two points may thus represent differing amounts of pollution credits, depending on the purchase price of the pollution credit at the time the points were assigned. The base cost may be marked up to accommodate variations in demand and markets, thereby insuring against a short-term drop in pollutant price. The base cost may be further marked up to generate profits. For example, a point may be obtained at a value of $0.0025 by, e.g., purchasing a metric ton (2,205 pounds) of pollution at a cost of $5.50. The point may be distributed to a facilitator 112, as explained further below, at a price of $0.0045, thereby producing a profit per point of $0.0020, prior to processing and redemption costs (e.g., cash paid to facilitators 112 who present points for redemption 120 and/or from purchasers 116 who present points for redemption).

In one embodiment, the system 100 tracks the creation of points and the pollution credits associated therewith and stores this information in the database 108. Historical point prices may be used to calculate current point markup; e.g., if the price has recently been fluctuating, a greater markup may be assigned to offset the risk of an adverse fluctuation. Each point may be assigned a unique identification code, and this code may accompany the point as it is distributed, as explained further below.

The points may be sent, via the point-transmission module 110 over the communications channel 118, to the facilitator 112 (Step 208). The facilitator 112 may be a manufacturer (e.g., an OEM), a producer of goods, a direct marketer, a service provider, a distributor, and/or a merchant. Other examples of facilitators include brand manufacturers such as appliance manufacturers and cereal companies; service enterprises such as airlines, car rental agencies and hotels/motels; direct markers, both print-mail and Internet; and retail merchants, such as supermarkets and chain stores.

A facilitator 112 may associate points with an offered good or service as an incentive to a consumer (or other downstream purchaser 116). The product or service may indicate, for example, the number or amount of pollution credits that may be retired as a result of purchasing the product or service. The facilitator 112 may employ a logo or slogan on the product or service, or associated with a group or products or services, to advertise the "green" impact of the purchase. The facilitator 112 may set the number of points to be associated with a consumer purchase based on its dollar value (e.g., one point per dollar) or based on other promotional standards (e.g., a fixed point value if the purchase occurs in a given timeframe).

The associated points may be offered in a variety of forms and media. For example, the points may be printed on a paper coupon having a unique identification code, number, or symbol (such as a UPC symbol or bar-coded data). In one embodiment, the points are encoded on an RFID tag associated with the product or service. The coupon may be bundled with a product or may be printed on the product's packaging. In other embodiments, the points appear as advertising media or are sent as self-mailers. The points may be attached to product warranty cards issued by, e.g., OEMs, or be included in information (such as directions for use) that accompanies consumer products. The points may be printed on service contracts (e.g., car rental agreements, airline tickets, or hotel/ motel reservation tickets/forms) or may appear as part of a purchase receipt or register tape. In one embodiment, the points are distributed electronically in, for example, an email or personalized web page or displayed on an e-commerce checkout or confirmation web page. Electronic points may be read, downloaded, printed, and/or forwarded. The electronic points may be associated with credit and or debit card purchases (e.g., as part of a credit/debit card reward program) or incorporated with a merchant's customized "affinity" rewards card (i.e., credit or debit cards sponsored by a merchant or an organization). The electronic points may be displayed by search engine advertisers alongside relevant search results. The term "coupon," as used throughout this application, may apply to any and all of the aforementioned point distribution mechanisms, as well as other means of distributing points as known in the art.

In one embodiment, the facilitator sells or distributes the points to another provider of products or services instead of to a consumer. In fact, the points may change hands several times before the final sale to a consumer. In various embodiments, pricing models permit facilitators to pay for points "up front" (e.g., as they are distributed) or later, as consumers redeem them (e.g., a "pay for performance" model). In one embodiment, the system 100 tracks the sale and movement of each point and stores this information in the database 108.

Points in a pool may be left unsold if the size of the pool shrinks to an unusable amount or if the points remain unsold for too long a span of time and subsequently expire. Unsold points within a pool may be rolled over to a new pool or may be converted back into their original pollutant form for sale as a commodity in a pollutant-trading market. In one embodiment, a pool is closed when all points in it are sold or expired.

Once a purchaser 116 purchases a product or service associated with the points, the purchaser 116 may send a request to the point-receiving module 114 within the system 100 to redeem the points (Step 210). The request may identify the unique identification code associated with the points, and the point-receiving module 114 may cross-reference the identification code with information stored in the computer database 108. The point-receiving module 114 may reject the request if, for example, the points have been previously redeemed.

The request may be submitted electronically or otherwise. For example, the request may be mailed in via the U.S. mail service or a package delivery service. In one embodiment, the point-receiving module 114 includes a telephone service to which a purchaser may call and communicate the point identification code. The telephone service may be operated by a call center or by an automatic voice menu system. In other embodiments, the request is received via the Internet in the form of an email, web page submission, or through the use of a custom client application.

A purchaser may be required to create a user profile or account with the system 100 before submitting a request to redeem a purchased point. The registration of the user profile may be made by mail, phone, and/or Internet; in one embodiment, however, subsequent interactions are made exclusively over the Internet. Creation of the user profile may require that the purchaser 116 enter identifying information such as name, address, and/or telephone number, and this information may be stored in the computer database 108. The information may be used to validate the purchaser 116 in order to prevent or reduce fraudulent transactions. The purchaser 116 may choose, during registration, to receive news and information about products in which the purchaser 116 has an interest. In one embodiment, the purchaser 116 is given a point award for using a preferred registration mechanism, such as registering via the Internet.

The purchaser's user account may be used to accumulate points for later redemption (as described in more detail below). The system 100 may, upon request, provide an account summary (including points earned) to the purchaser 116. In one embodiment, the point-receiving module 114 may automatically receive a request to accumulate points when a purchaser buys a product or service. For example, the purchaser 116 may receive points from a purchase made over a web site, and the web site may send a request to add the points to the purchaser's account. In another embodiment, the facilitator 112 possesses customized point-of-sale equipment (e.g., a modified credit-card reader) that communicates automatically with the system 100. The purchaser 116 may customize the user account to allow or disallow such automatic point accumulations; the web site may provide this option on a per-purchase basis via, for example, a check box. A purchaser 116 may be encouraged to accumulate points by offering, for example, bonus points at certain levels of accumulation. In one embodiment, a purchaser 116 may purchase more points directly with cash in order to reach, for example, a desired point total.

In one embodiment, the purchaser 116 trades promotional credits received from other entities with the point-receiving module 114 in exchange for points. For example, a purchaser 116 may have an account with an airline and may have accumulated frequent-flier miles. The purchaser 116 may redeem some or all of the frequent-flier miles for a number of points negotiated between the system 100, airline, and/or purchaser 116. For example, the cash value of the frequent-flier miles may be traded for an equivalent cash value of points. The other entity may charge a premium to the purchaser 116 for the transaction in the form of a fee and/or a less-favorable exchange rate. In another example, a purchaser 116 has accumulated promotional credits on an affinity card (i.e., a credit card that earns promotional credits upon use); these credits may also be converted into points.

A point-redemption module 120 sends a redemptive value to the purchaser 116 in exchange for points (Step 212). In one embodiment, a one-time, unregistered purchaser 116 receives the value of every submitted point. In other embodiments, a purchaser 116 has a user account and may redeem some or all of accumulated points. The redemptive value is sent over the communications channel 118 via mail (e.g., a check, money order, gift certificate, or store coupon) or via the Internet (e.g., an electronic transfer or electronic store credit).

The redemptive value may be cash or credit at one or more of the facilitators 112 originally offering the points or at any other facilitator 112. The credit value may be greater than the cash value offered for the same number of points, in accordance with a request from a facilitator 112, to provide an incentive to the purchaser 116 to opt for the credit and return to the facilitator 112 for further purchases. For example, a purchaser 116 may redeem 1000 points for either $10 of cash or $20 of store credit. In one embodiment, the purchaser 116 redeems points by donating their value to a charity or non-profit enterprise.

If the facilitator 112 has already transferred value to the system 100 in exchange for the points, the point-receiving module 114 may send a corresponding value, in exchange for the points, to the purchaser 116 directly. If, on the other hand, the facilitator 112 has not paid for the points (i.e., the "pay for performance" model described above), the point-receiving module 114 may first send a request to the facilitator 112 for payment commensurate with the redemption request. The point-receiving module 114 may send the redeemed value to the purchaser 116 only when the payment is received from the facilitator 112.

In one embodiment, a purchaser 116 may redeem points directly with a facilitator 112. For example, if the purchaser 116 has already accumulated points with the system 100, and if a facilitator 112 so agrees, the purchaser 116 may apply the previously-accumulated points to a current transaction with the facilitator 112. Thus, the purchaser 116 may receive a discount on a purchase by applying points, or may even be able to purchase a product or service outright using points. In such a transaction, the facilitator 112 may first confirm that the purchaser 116 legitimately possesses the claimed points by querying the database 108 via the communications channel 118. The system 100 may provide verification and, if the transaction is completed, decrement the number of points in the purchaser's account accordingly. The system 100 may require that the facilitator 112 register an account before the system 100 permits the transaction to occur.

As one example, a metric ton (i.e., approximately 2,200 pounds) of carbon dioxide may be translated into 2,200 points. For every dollar of purchase by a purchaser 116, a single point is issued thereto. Thus, a $120.00 purchase rewards the purchaser 116 with 120 points. Each point may be assigned a value of $0.01 by the facilitator 112, so that the $120 purchase earns (rewards) the purchaser 116 the equivalent of $1.20 in discounts on subsequent purchases with the facilitator 112, $1.20 in charitable donations, or $0.60 in cash. In this example, once the purchaser 116 has aggregated 2,200 points (i.e., $2,200 in purchases), the purchaser 116 has removed one metric ton of carbon from the cap-and-trade market. Here, the point-purchasing facilitator 112 incurs a cost equal to 1% of sales at retail.

The distribution of points and sale and redemption thereof may be tracked by the system 100. As described above, identifying information such as barcodes or RFID tags may be used to garner information about each transaction (printed or electronic) and to permit the capturing and tracking of data. The identifying information may be specific to a single transaction, stock-keeping unit, and/or purchase. Each time a purchaser 116 initiates or completes a transaction, data (e.g., the number of points associated with the transaction) may be collected. Many methods of data collection exist, such as by communicating with point-of-sale equipment, by mailing physical coupons, by fax, via the Internet and/or email, and/or by telephonically providing numeric data inscribed on coupons. The transactional data may be stored in the computer database 108.

The collected data may be mined for demographic information and/or buying habits of purchasers 116 and may be sold or rented to third parties (including facilitators 112). Facilitators 112 may purchase the data to track the effectiveness of advertising campaigns, to examine trends in sale frequencies, and/or to control inventory and re-stocking frequency. Third parties may use the collected data for cross-promotions, such as contacting interested purchasers 116 about environmental events or opportunities. Purchasers 116 likely to donate based on the collected data may also be solicited for donations (of cash or points). Other parties interested in purchasing the collected data may include academic institutions, companies involved with clean technology or clean energy, and/or government agencies. In one embodiment, facilitators 112 may pay an additional fee to communicate promotions and offers directly to registered purchasers 116. The system 100 may further use the collected data to prevent fraud by, for example, detecting a purchase out of the ordinary given a particular purchaser's buying history. The collected data, along with any and all other data stored in the system 100 and computer database 108, may be encrypted to prevent accidental discharge thereof.

Figure 3:
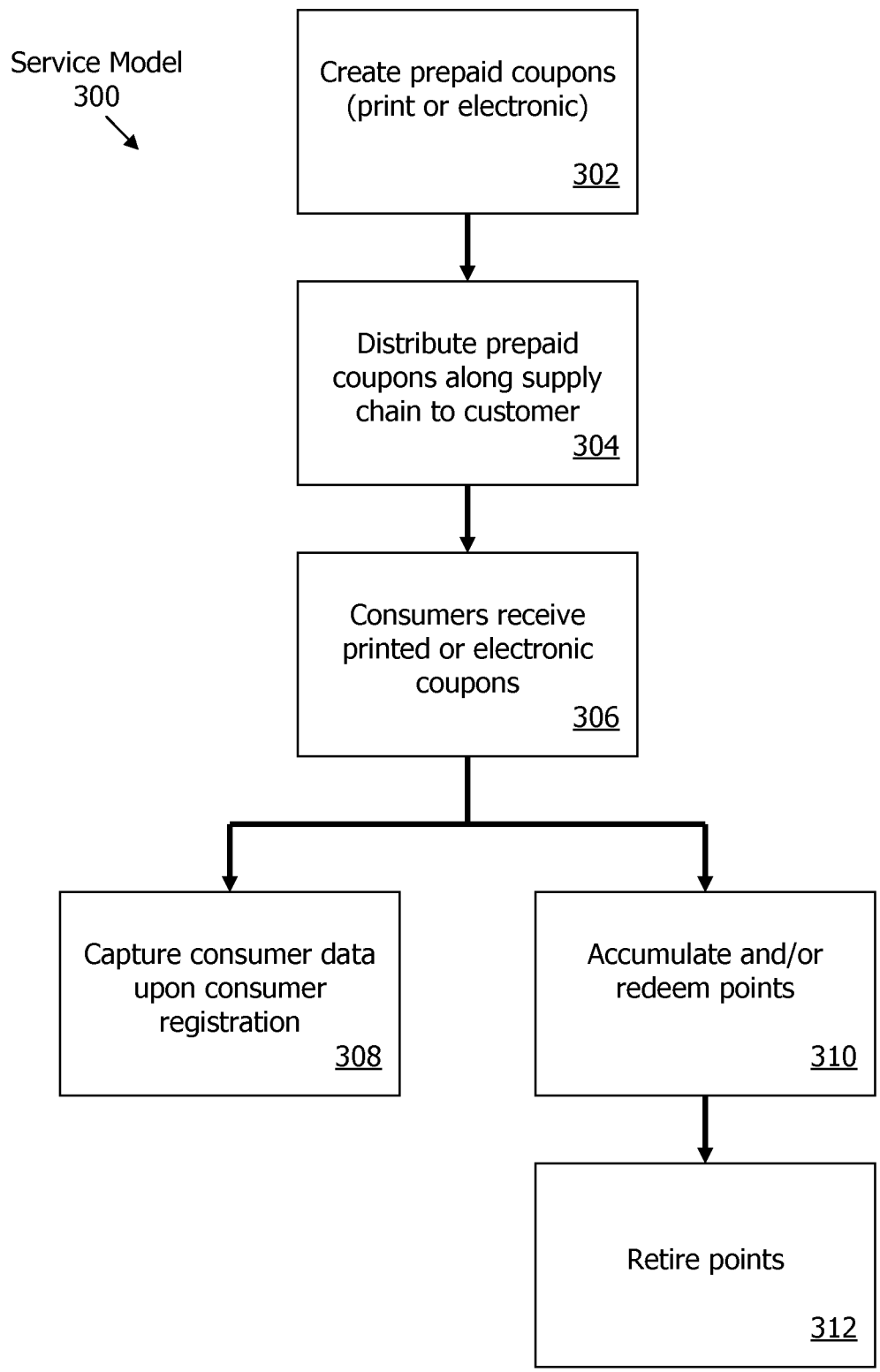
FIG. 3 is a flow chart of a service provider model for distributing points in accordance with an embodiment of the invention.

FIG. 3 illustrates a service model 300 for distributing points. In this model, service industries (such as the travel and hospitality industries) distribute prepaid coupons, created by the system 100 (Step 302), along a supply chain to a customer (304). In one embodiment, bar codes are used to uniquely identify the points, which may be sold to the service company in pre-numbered blocks. The distributed points may be printed as coupons or directly onto service contracts. In one embodiment, the points are added electronically to the service company's website shopping cart. In an alternative embodiment, the system 100 provides preprinted coupons. The system 100 may send appropriate data to the service provider so that the service provider may print coupon data on its own service contracts or agreements.

Consumers receive the printed or electronic coupons (Step 306) and, as described above, may have to register with the system 100 to accrue and/or redeem them (Step 310). For example, a consumer may redeem points obtained from a single transaction or may accrue points from multiple transactions before redemption. Some or all of the transactional information may be captured by the system 100 for storage (Step 308). Upon registration, the system 100 may notify the service provider, which may contact the consumer (in one embodiment, only with the consumer's permission) to engage in marketing activities such as up-sells or cross sells. Consumers may apply points from their account as a discount against additional purchases (on a basis to be established by the service company). The points used may be automatically decremented or incremented to the consumer's account, depending on the transaction. Newly earned points may not be immediately available for redemption to allow for proper recording, validation, or other operations.

As an example, a customer pre-registered with the system 100 buys an airline ticket having 1,000 points associated with the sale. The travel service issues the points by printing them on the purchased ticket. The points are not immediately available against the cost of that ticket, because the customer must first have them recorded/validated by the system 100. A pre-registered customer, however, may have other points in the system 100 redeemable for the transaction and may apply those points. The system 100 may apply the previously accrued points against the cost of the ticket and later add the points associated with the purchase of the ticket to the consumer's account. A new, unregistered customer may register with the system 100 in order to gain future program benefits associated with the points earned through the purchase of the ticket.

In one embodiment, the service model does not permit a "pay for performance" model, and all point sales must be paid up front. Note that a point distributor may never encounter a consumer returning the points (or any points) as a discount; the points may go unused or may be used at a different service company, used with the purchase of goods, and/or donated to charitable causes. The points may be retired (Step 312) once a redemptive value is conveyed to the consumer.

Figure 4:
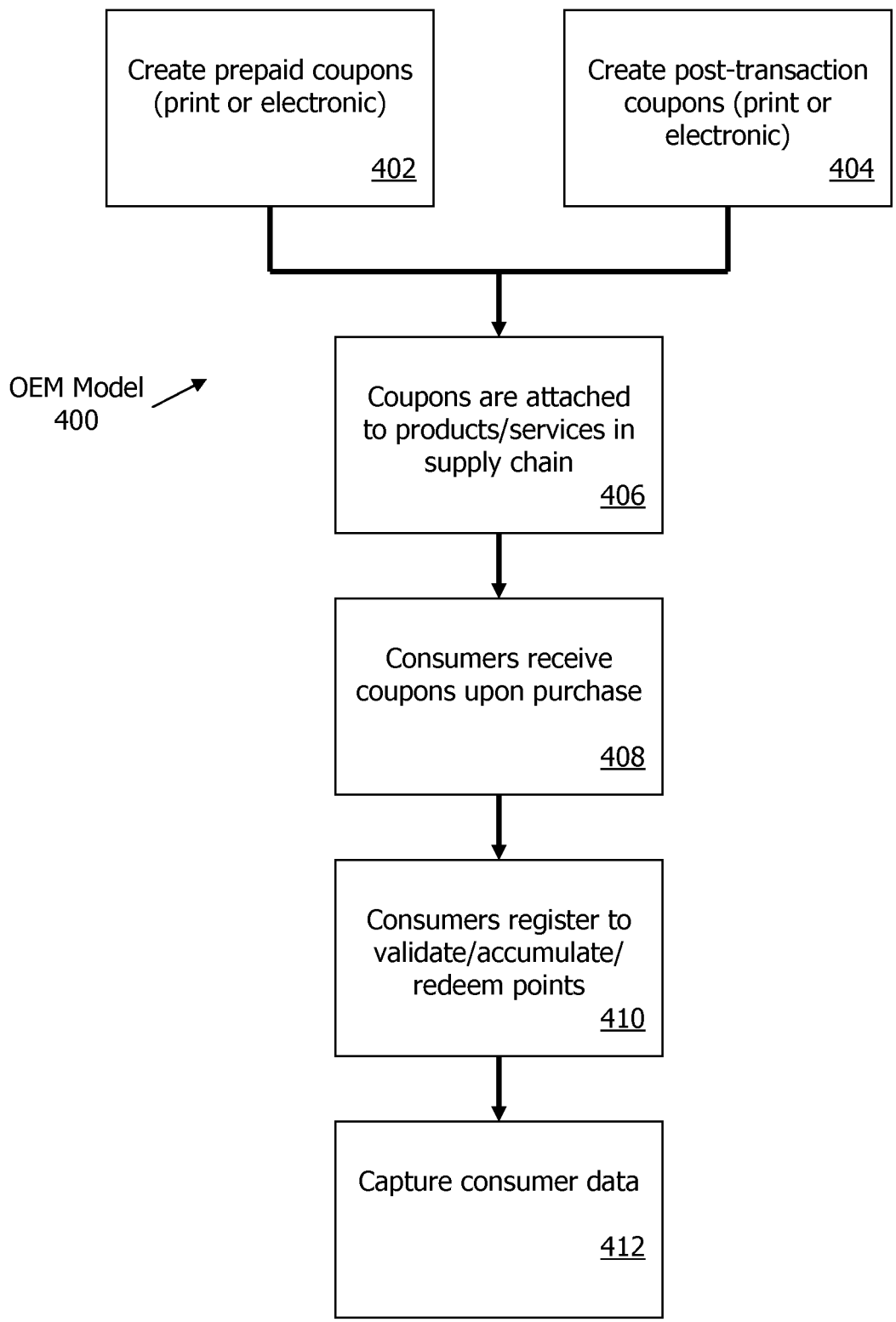
FIG. 4 is a flow chart of an original-equipment manufacturer ("OEM") and/or branded product producer model for distributing points for in accordance with an embodiment of the invention.

FIG. 4 illustrates an OEM model 400 for distributing points. OEMs (and other producers) may buy pre-printed coupons (Step 402) having predetermined point values or may print the coupons themselves (onto, e.g., warranty cards) from a block of assigned numbers. The OEM may award as many or as few points per stock-keeping unit ("SKU") as they choose. An electronic coupon (for use with in-store or on-line purchases) may be used (Step 404) by accessing a designated web site and entering coded data. The coded data may be a part of printed material that accompanies the merchandise. This electronic option will be available for those purchasing in-store as well as on-line. OEMs may be given the option of paying for the points post customer transaction, but at a significant premium.

The OEM may attach points to products or services in its supply chain (Step 406), but may not conduct a transaction directly with a consumer. Instead, the attached points move down through the supply chain with the product or service, and the OEM may not have further involvement with, e.g., redeeming the points. A consumer receives the points further down the supply chain upon purchasing the product or service (Step 408). In one embodiment, however, the OEM sells directly to consumers, in which case the OEM transacts with the system 100 to verify and redeem the points. As described above, a consumer may register with the system 100 to validate, accumulate, and/or redeem points (Step 410), and once the points are redeemed, they are retired from use. Throughout the OEM model 400, consumer data is captured and stored (Step 412).

In one embodiment, a consumer elects to apply earned points toward payment of an OEM product. The consumer may pay full price then later register the purchase with the system 100. The consumer's account may therefore be decremented a commensurate amount, and the system 100 redeems the appropriate value to the consumer and charges the OEM. In another embodiment, the OEM verifies the existence of points in the consumer's account at the time of sale and decrements the points accordingly.

When a consumer uses the coupons to receive a discount on purchases, the final seller in the supply chain (e.g., a merchant or retailer) may grant the discount and redeem the points with the system 100. Thus, if the retailer did not originally purchase the points from the system 100, the retailer may not pay for the cost of the discount, and may present the redeemed points to be recompensed for the discount offered the consumer. The cost of the points as purchased by the OEM, for example, may be sufficient to allow the system 100 to cover all the costs of redemption.

Figure 5:
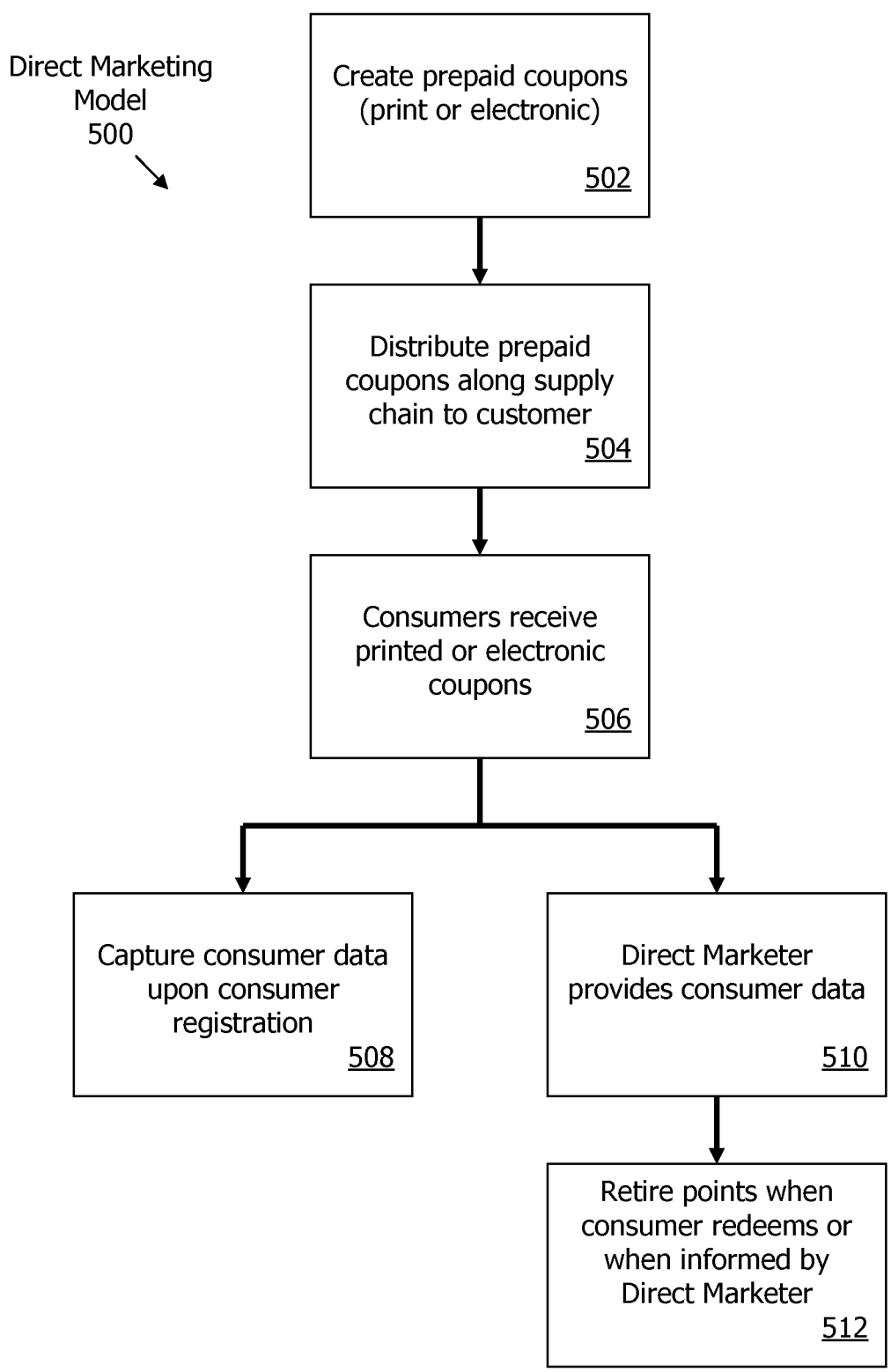
FIG. 5 is a flow chart of a direct marketer model for distributing points in accordance with an embodiment of the invention.

FIG. 5 illustrates a direct marketer model 500 for distributing points. In one embodiment, only prepaid points are allowed (Step 502), except for marketing programs that prospect for new customers. Prospective customers may be encouraged to register with the system 100 in addition to with the marketer. The prospective customers may have their points registered and the system 100 may charge the marketer therefor.

The direct marketer may distribute the points along the supply chain to potential customers (Step 504) who may receive them in print or electronic form (Step 506). Bar-coded points may be printed along side each displayed SKU or to cover an entire catalog content or web-page content and eventually shown on, e.g., an order blank or shopping cart. Points (bar coded or RFID) may become part of order fulfillment and thus ride along with SKU delivery to the consumer. A direct marketer's order entry and processing systems may be adapted to accommodate discounts based on points redemption or to handle the addition of points to a customers account. Note, however, that points issued from one channel may not be honored (or honored to a greater or lesser degree) in another channel. For example, consumers may be led from one channel (e.g., retail stores or catalogs) to a more desired one (e.g., a web site) using this mechanism.

As described above, consumer data may be captured upon registration or at any other time (Step 508). The direct marketer may also provide any other consumer data (gathered, for example, though other means) to the system 100 (Step 510). The points may be retired when the consumer redeems them or when the system 100 is so informed by the direct marketer (Step 512). Direct marketers may be informed each time one of their customers registers or engages in a points transaction, and may be informed, for a fee, of total banked points balances for those customers. Customers having a high points total may be more likely to respond favorably to a request from the direct marketer. In one embodiment, direct marketers may rent names from the system 100 (for a fee) to engage in marketing campaigns of their own design.

Figure 6:
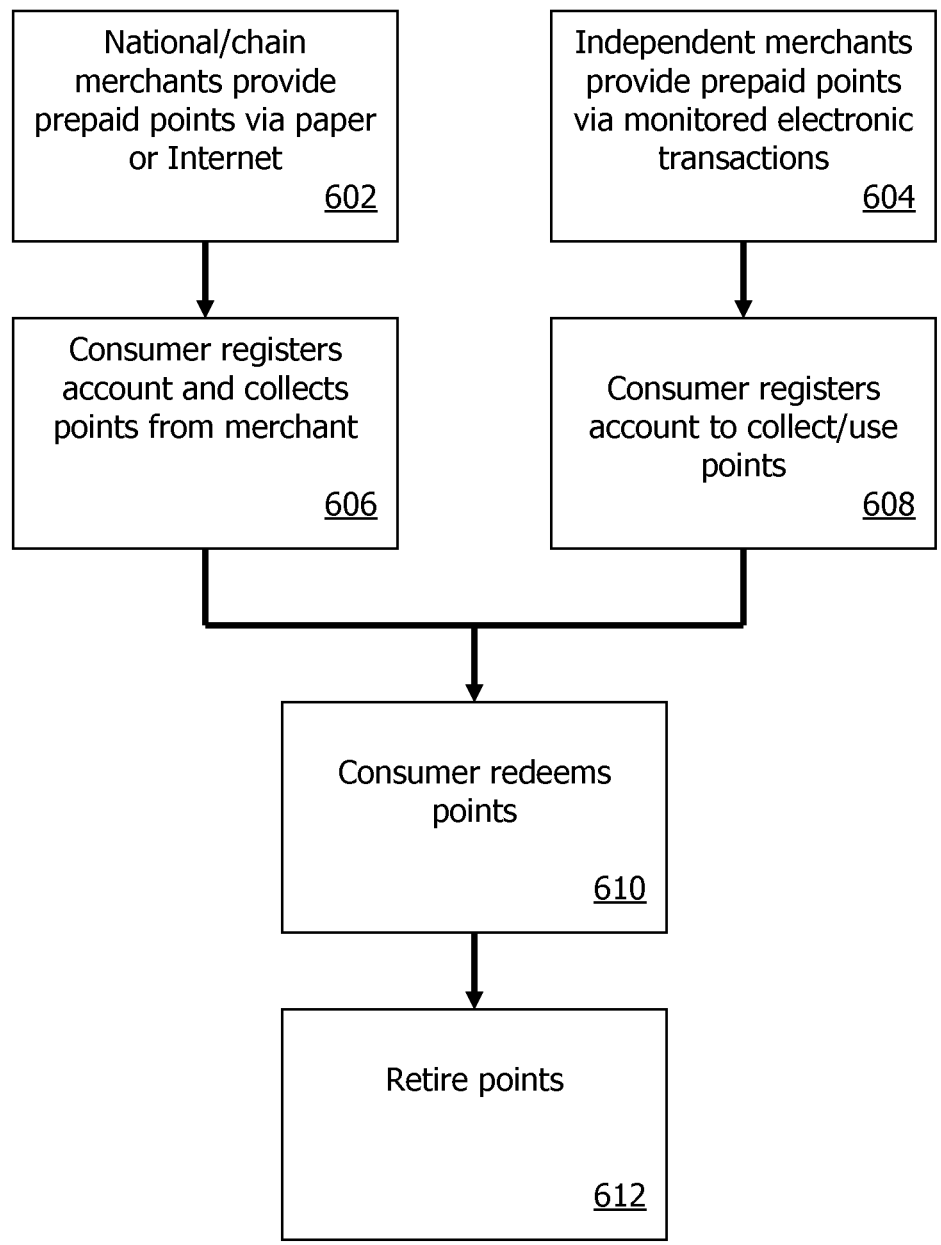
FIG. 6 is a flow chart of a retail merchant model for distributing points in accordance with an embodiment of the invention

FIG. 6 illustrates a retail merchant model 600 for distributing points. National or chain merchants (e.g., supermarkets and department stores) may provide prepaid points via barcoded print or electronic coupons, store affinity cards, or register tapes (Step 602). Smaller, independent merchants may be restricted to providing prepaid points only electronically in order to verify each sale (Step 604). Any paper-based coupons may need to be scanned or otherwise electronically read, and subsequently transmitted to the system 100, in order to be associated with a particular sale. Note that a product offered by the merchant may already be bundled with paper- or electronic-based points; the merchant need not scan and transmit these points, because the upstream bundler has already done so.

A consumer may collect points from the national/chain merchant (Step 606) but may have to register with the system 100 in order to collect or use points received from the independent merchant (Step 608). In other words, national/chain merchants may manage their customer accounts without having to report every transaction to the system 100 (until a point redemption is requested). In either case, the consumer must be registered with the system 100 to redeem points (Step 610), and the points are retired upon redemption (Step 612). Merchants may honor coupons (from any facilitator) presented by consumers for redemption in merchandise, as long as the consumer is registered with the system 100. In one embodiment, merchants load their own affinity cards with points. In another embodiment, a point-compatible affinity card may be used with any facilitator.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain embodiments of the present invention are described above. It is, however, expressly noted that the present invention is not limited to those embodiments, but rather the intention is that additions and modifications to what is expressly described herein are also included within the scope of the invention. Moreover, it is to be understood that the features of the various embodiments described herein were not mutually exclusive and can exist in various combinations and permutations, even if such combinations or permutations are not made express herein, without departing from the spirit and scope of the invention. In fact, variations, modifications, and other implementations of what is described herein will occur to those of ordinary skill in the art without departing from the spirit and the scope of the invention. As such, the invention is not to be defined only by the preceding illustrative description.

What is claimed is:

1. A method for reducing pollution comprising the steps of:
receiving, from a pollution-credit source, a credit representing an amount of pollution in exchange for a first monetary amount;
converting, using a computer processor, the credit into a credit point value, the credit point value comprising a plurality of points, each point having an equal monetary value corresponding to a fraction of the first monetary amount;
storing the credit point value in a database embodied on a computer-readable medium;
including the credit point value in a pool of credit point values;
sending the points to a point distribution facilitator, the points being associated with at least one of a product and a service;
receiving a second monetary amount from the point distribution facilitator in exchange for the sent points, the second monetary amount being greater than the first monetary amount;
receiving, from the point distribution facilitator and a purchaser of the product or service, a request to redeem at least some of the points;
reimbursing, in response to the request to redeem, a portion of the second monetary amount to the point distribution facilitator;
sending a redemptive value to the purchaser in exchange for the at least some of the points; and
upon redeeming a total number of points equaling the credit point value, retiring the credit, thereby ensuring the amount of pollution represented by the credit is not emitted.

2. The method of claim 1, further comprising storing data regarding the purchaser in the database.

3. The method of claim 2, further comprising sending the data regarding the purchaser to a third party in exchange for value.

4. The method of claim 1, further comprising validating that the credit represents the amount of pollution.

5. The method of claim 1, further comprising receiving credits from a plurality of pollution-credit sources.

6. The method of claim 1, further comprising:
receiving, from the facilitator, a message indicating a transfer of the point value to a second distributor; and
storing the message in the database.

7. The method of claim 1, wherein the point value is embodied on at least one of a printed coupon, an electronic coupon, a tag, a warranty, a product package, a service contract, and a computer icon.

8. The method of claim 1, wherein the redemptive value comprises at least one of a monetary value, a product discount, a charitable contribution, and combinations thereof.

9. The method of claim 1, wherein the facilitator is selected from the group consisting of a manufacturer, a direct marketer, a service provider, a distributor, and a merchant.

10. The method of claim 1, wherein the pollution-credit source is selected from the group consisting of a government entity, a pollution emitter, a commodity exchange, and a pollution-credit market.

11. The method of claim 1, wherein the amount of pollution corresponds at least in part to at least one of a carbon credit, carbon dioxide effluent, and another greenhouse gas effluent.

12. A computer-based system for reducing pollution, the system comprising:
at least one computer memory for storing a credit representing an amount of pollution, the credit received from a pollution-credit source; and
at least one processor for executing instructions stored on the computer memory, wherein execution of the instructions results in the system further comprising:
a point-determination software module configured to convert the credit into a credit point value comprising a plurality of points;
a computer database configured to store the credit point value;
a pooling software module configured to include the credit point value in a pool of credit point values;
a point-transmission software module configured to track sending of the points to a point-distribution facilitator, the points being associated with a product or service;
a point-receiving software module configured to:
track receipt of a request to redeem at least some of the points from a purchaser of the product or service;
upon receiving the request to redeem the at least some of the points, determine that the point-distribution facilitator has not previously provided payment in exchange for the points to be redeemed; and
in response to the determination, request payment from the point-distribution facilitator for the points to be redeemed;
a point-redemption software module configured to track sending of a redemptive value to the purchaser in exchange for the at least some of the points; and
a credit-tracking software module configured to retire the credit upon determining that a total number of points equaling the credit point value has been redeemed, thereby ensuring the amount of pollution represented by the credit is not emitted.

13. The system of claim 12, wherein the computer database is further configured to store data regarding the purchaser in the database.

14. The system of claim 12, further comprising a point-validation software module configured to validate that the credit represents the amount of pollution.

15. The system of claim 12, wherein the computer memory further stores credits from a plurality of pollution-credit sources.

16. The system of claim 12, wherein the computer database further stores a message indicating a transfer of the point value to a second distributor.

17. The system of claim 12, wherein the point value is embodied on at least one of a printed coupon, an electronic coupon, a tag, a warranty, a product package, a service contract, and a computer icon.

18. The system of claim 12, wherein the redemptive value comprises at least one of a monetary value, a product discount, a charitable contribution, and combinations thereof.

19. The system of claim 12, wherein the facilitator is selected from the group consisting of a manufacturer, a direct marketer, a service provider, a distributor, and a merchant.

20. The system of claim 12, wherein the pollution-credit source is selected from the group consisting of a government entity, a pollution emitter, a commodity exchange, and a pollution-credit market.

21. The system of claim 12, wherein the amount of pollution corresponds at least in part to at least one of a carbon credit, carbon dioxide effluent, and another greenhouse gas effluent.

22. An article of manufacture storing computer-readable instructions thereon for reducing pollution, the article of manufacture comprising:

- instructions to store a credit representing an amount of pollution in computer memory, the credit received from a pollution-credit source in exchange for a first monetary amount;
- instructions to convert the credit into a credit point value, the credit point value comprising a plurality of points, each point having a first equal monetary value corresponding to a fraction of the first monetary amount;
- instructions to store the credit point value in a computer database;
- instructions to include the credit point value in a pool of credit point values;
- instructions to track sending of the points to a point distribution facilitator, the points being associated with a product or service;
- instructions to track receipt of a request to redeem at least some of the points from a purchaser of the product or service;
- instructions to track receipt of a request to redeem the at least some of the points from the point distribution facilitator;
- instructions to determine that the point distribution facilitator has not previously provided payment in exchange for the points to be redeemed;
- instructions to request payment from the point distribution facilitator for the points to be redeemed;
- instructions to receive a second monetary amount from the point distribution facilitator in exchange for the points to be redeemed, each point to be redeemed having a second equal monetary value corresponding to a fraction of the second monetary amount, the second equal monetary value being greater than the first equal monetary value;
- instructions to track sending of a redemptive value to the purchaser in exchange for the at least some of the points; and
- instructions to retire the credit upon determining that a total number of points equaling the credit point value has been redeemed, thereby ensuring the amount of pollution represented by the credit is not emitted.

23. The article of manufacture of claim 22, wherein the computer database further stores data regarding the purchaser in the database.

24. The article of manufacture of claim 22, further comprising instructions to validate that the credit represents the amount of pollution.

25. The article of manufacture of claim 22, wherein the computer memory further stores credits from a plurality of pollution-credit sources.

26. The article of manufacture of claim 22, wherein the computer database further stores a message indicating a transfer of the point value to a second distributor.

27. The article of manufacture of claim 22, wherein the point value is embodied on at least one of a printed coupon, an electronic coupon, a tag, a warranty, a product package, a service contract, and a computer icon.

28. The article of manufacture of claim 22, wherein the redemptive value comprises at least one of a monetary value, a product discount, a charitable contribution, and combinations thereof.

29. The article of manufacture of claim 22, wherein the facilitator is selected from the group consisting of a manufacturer, a direct marketer, a service provider, a distributor, and a merchant.

30. The article of manufacture of claim 22, wherein the pollution-credit source is selected from the group consisting of a government entity, a pollution emitter, a commodity exchange, and a pollution-credit market.

31. The article of manufacture of claim 22, wherein the amount of pollution corresponds at least in part to at least one of a carbon credit, carbon dioxide effluent, and another greenhouse gas effluent.

32. The article of manufacture of claim 22, further comprising instructions to reimburse a portion of the second monetary amount to the point distribution facilitator.

* * * * *